United States Patent
Divilly et al.

(10) Patent No.: US 10,536,545 B2
(45) Date of Patent: Jan. 14, 2020

(54) CLOUD DATABASE CONNECTION MULTIPLEXING

(71) Applicant: Oracle International Corporation, Redwood Shores, CA (US)

(72) Inventors: Colm Divilly, Redwood Shores, CA (US); Kristopher Leland Rice, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 480 days.

(21) Appl. No.: 14/485,621

(22) Filed: Sep. 12, 2014

(65) Prior Publication Data
US 2015/0095343 A1   Apr. 2, 2015

Related U.S. Application Data

(60) Provisional application No. 61/883,905, filed on Sep. 27, 2013.

(51) Int. Cl.
*H04L 29/08*     (2006.01)
*H04L 12/721*    (2013.01)
*H04L 12/931*    (2013.01)

(52) U.S. Cl.
CPC ............ *H04L 67/28* (2013.01); *H04L 45/72* (2013.01); *H04L 49/355* (2013.01)

(58) Field of Classification Search
CPC ....... H04L 67/28; H04L 67/327; H04L 45/72; H04L 45/74; H04L 49/355
See application file for complete search history.

(56) References Cited

U.S. PATENT DOCUMENTS

| | | | |
|---|---|---|---|
| 5,732,262 A | 3/1998 | Gillespie | |
| 6,603,758 B1* | 8/2003 | Schmuelling | H04L 12/2872 370/351 |
| 7,680,819 B1 | 3/2010 | Mellmer et al. | |
| 8,429,179 B1* | 4/2013 | Mirhaji | G06F 17/30312 707/756 |

(Continued)

OTHER PUBLICATIONS

U.S. Appl. No. 14/485,616, Filed 069/12/2014, Office Action, dated Sep. 9, 2016.

(Continued)

*Primary Examiner* — Kris E Mackes
*Assistant Examiner* — Lin Lin M Htay
(74) *Attorney, Agent, or Firm* — Hickman Palermo Becker Bingham LLP

(57) ABSTRACT

Techniques are described herein for routing requests for database cloud services. In an embodiment, a different Uniform Resource Identifier (URI) is assigned to each respective database schema of a plurality of database schemas in one or more databases. For each respective database schema, mapping data is stored that maps at least a portion of the URI to the respective database schema. In response to receiving a first request that includes a URI and a set of one or more database commands, a target database schema in a target database is identified based on the mapping data and the URI. A connection is established for accessing the target database schema in the target database. The set of one or more database commands is sent over the connection to access the target database schema in the target database.

26 Claims, 6 Drawing Sheets

(56) References Cited

U.S. PATENT DOCUMENTS

| | | | |
|---|---|---|---|
| 8,433,771 B1* | 4/2013 | Ellsworth | H04L 67/125 |
| | | | 709/213 |
| 8,615,528 B2 | 12/2013 | Shah | |
| 8,819,068 B1 | 8/2014 | Knote | |
| 2003/0108059 A1* | 6/2003 | Yew | H04L 47/15 |
| | | | 370/443 |
| 2003/0172090 A1* | 9/2003 | Asunmaa | G06F 21/31 |
| 2005/0198074 A1 | 9/2005 | Khayter | |
| 2006/0074876 A1* | 4/2006 | Kakivaya | G06F 17/30067 |
| 2006/0248599 A1 | 11/2006 | Sack | |
| 2008/0027947 A1* | 1/2008 | Pritchett | G06F 17/30887 |
| 2010/0061250 A1 | 3/2010 | Nugent | |
| 2011/0302267 A1* | 12/2011 | Christensen | G06F 8/31 |
| | | | 709/217 |
| 2011/0320400 A1 | 12/2011 | Namini | |
| 2012/0089562 A1 | 4/2012 | Deremigio | |
| 2012/0173513 A1 | 7/2012 | Agrawal | |
| 2012/0173581 A1 | 7/2012 | Hartig | |
| 2012/0324069 A1 | 12/2012 | Nori | |
| 2013/0005336 A1* | 1/2013 | Ayotte | H04W 12/06 |
| | | | 455/435.1 |
| 2013/0046799 A1 | 2/2013 | Hale | |
| 2013/0232463 A1 | 9/2013 | Nagaraja | |
| 2013/0339399 A1 | 12/2013 | Dorris | |
| 2014/0006367 A1 | 1/2014 | Hills | |
| 2014/0040999 A1 | 2/2014 | Zhang | |
| 2014/0075027 A1 | 3/2014 | Chatterjee | |
| 2014/0280961 A1 | 9/2014 | Martinez | |
| 2015/0058376 A1 | 2/2015 | Soshin | |
| 2015/0067171 A1 | 3/2015 | Yum | |
| 2015/0095796 A1 | 4/2015 | Kutz et al. | |
| 2015/0095973 A1 | 4/2015 | Neumueller et al. | |
| 2015/0295781 A1 | 10/2015 | Maes | |

OTHER PUBLICATIONS

U.S. Appl. No. 14/485,614, filed Sep. 12, 2014, Office Action, dated Oct. 25, 2016.

Securosis, "Understanding and Selecting a Database Security Platform," Version 2, dated May 15, 2012, pp. 1-34.

Oracle, "Effective Resources Management Using Oracle DB Resource Manager", An Oracle White Paper, dated Jun. 2011, 1-24 pages.

Oracle 9i, "Privileges, Roles and Security Policies, Database Concepts", Release 2 (9.2), Dated Nov. 28, 2011, pp. 1-8.

Neumueller, U.S. Appl. No. 14/485,616, filed Sep. 12, 2014, Final Office Action, dated Apr. 21, 2017.

Kutz, U.S. Appl. No. 14/485,614, filed Sep. 12, 2014, Interview Summary, dated Feb. 23, 2017.

Kutz, U.S. Appl. No. 14/485,614, filed Sep. 12, 2014, Final Office Action, dated Dec. 27, 2016.

Kutz, U.S. Appl. No. 14/485,614, filed Sep. 12, 2014, Office Action, dated Jul. 5, 2017.

Kutz, U.S. Appl. No. 14/485,614, filed Sep. 12, 2014, Final Office Action, dated Nov. 27, 2017.

\* cited by examiner

| MAPPING DATA | | |
|---|---|---|
| ADDRESS | DATABASE | SERVICE |
| URI Expression 1 | DB 1 | SCHEMA 1 |
| URI Expression 2 | DB 1 | SCHEMA 2 |
| URI Expression 3 | DB 1 | SCHEMA 3 |
| URI Expression 4 | DB 2 | SCHEMA 4 |
| URI Expression 5 | DB 2 | SCHEMA 5 |
| URI Expression 6 | DB 3 | SCHEMA 6 |
| .... | .... | .... |

CLOUD DATABASE CONNECTION MULTIPLEXING

CROSS-REFERENCE TO RELATED APPLICATIONS; BENEFIT CLAIM

This application claims the benefit of Provisional Appln. 61/883,905, filed Sep. 27, 2013, the entire contents of which is hereby incorporated by reference as if fully set forth herein, under 35 U.S.C. § 119(e). This application is related to U.S. Ser. No. 14/485,614, filed Sep. 12, 2014, the entire contents of which is hereby incorporated by reference as if fully set forth herein and referred to herein as LOADING A DATABASE INTO THE CLOUD. This application is also related to U.S. application Ser. No. 14/485,616, filed Sep. 12, 2014, the entire contents of which is hereby incorporated by reference as if fully set forth herein and referred to herein as CLOUD DATABASE LOCKDOWN.

FIELD OF THE INVENTION

The present disclosure relates to cloud computing and, more specifically, to techniques for routing connections to a database running on a cloud platform.

BACKGROUND

Cloud computing involves the use of computing resources (hardware and software) that are delivered as a service over a network (typically the Internet). To reduce the costs of providing the service to a plurality of consumers, cloud computing systems may use some form of resource sharing. For example, in some cloud computing models, consumers may share database resources.

One approach to the shared database model involves providing each consumer with their own database instance in a corresponding virtual machine. This approach allows users to share a virtual machine to access database resources. However, the scalability of this approach may be limited, as the number of virtual machines that the service provides may be restricted by the number of underlying processors of the physical machine. Furthermore, each virtual machine involves the overhead of the entire solution stack, from the operating system to the database instance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which:

FIG. 2 is a chart depicting example mapping data, according to an embodiment

DETAILED DESCRIPTION

Figure 1:
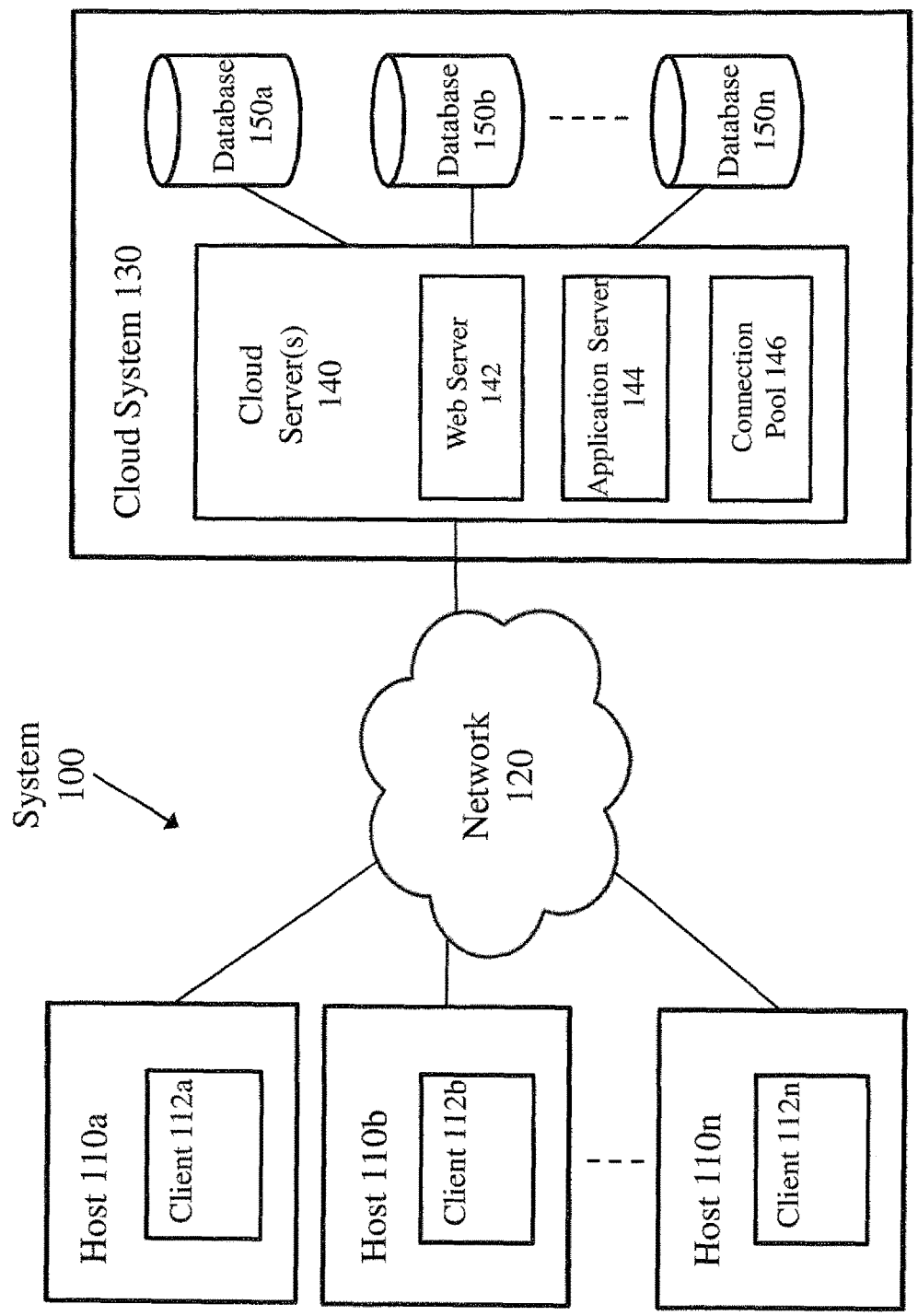
FIG. 1 is a block diagram depicting an example system that may be used to provide database cloud services to consumers, according to an embodiment.

Techniques are described herein for cloud database connection multiplexing. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, connections to a cloud database may be routed and multiplexed based on uniform resource identifiers (URIs). When a consumer registers for a database cloud service, the consumer may be provided with a URI-addressable database schema. The consumer may submit requests that include the URI over the Internet to a server responsible for routing the request to the appropriate database schema. To route the request, the server may store mapping data that maps at least a portion of the URI to the consumer's database schema. When a request is received, the server identifies a target database and target database schema based on the URI included in the request and the stored mapping data. The server may establish a connection to the target database schema and route the request to the target database for further processing.

The techniques described herein allow for relatively small user processes being the base unit of sharing, where multiple user processes share the same database instance. This may significantly increase the number of tenants that may be serviced by an individual database, which allows greater scalability and may reduce the costs associated with providing the cloud services.

Database Cloud Service

A "database cloud service" is a service that provides access to a database system running on a cloud platform. In order to use the service, a consumer creates an account through a registration or subscription process established by the service provider. The account may correspond to an individual user or a set of users, depending on the particular implementation. For example, an account may correspond to a particular organization that has a plurality of users that share access to a particular database cloud service. Each account may also be associated with one or more database cloud services, where the data loaded into each individual database cloud service is logically separated from data in other database cloud services within the cloud platform.

A "consumer" of a database cloud service is a set of one or more users associated with an individual account. When there are multiple users associated with an account, the users may have equal access privileges or the access privileges may vary from user to user or for different groups of users. For example, each account may have a particular user that acts as an account administrator. Certain account privileges may be reserved solely for the administrator. Example privileges that may be reserved for the account administrator include, without limitation, adding, defining, and deleting users for the corresponding database cloud service; paying fees, if any, associated with the account; and monitoring, configuring, and selecting administrative parameters for the respective account.

The cloud computing model of the database cloud service may vary from implementation to implementation. In an embodiment, the database cloud service may have some characteristics of a Platform-as-a-Service (PaaS) rather than a Database-as-a-Service (DBaaS). For example, the database cloud service may give the user programmatic access to an underlying database within the cloud platform through a structured query language (SQL) or a procedural language, such as a procedural language extension to SQL (e.g., PL/SQL). The user's programs may be executed from inside the cloud platform and/or through web services. As another example, the database cloud service may be a fully managed service, without requiring the user to perform maintenance operations on the underlying database or system software within the cloud. In addition or alternatively, the database cloud service may manage the configuration parameters for a database instance rather than the user and may allow multiple tenants on a single database instance. In other embodiments, the database cloud service may have one or more characteristics of a DBaaS. For example, in some embodiments the user may be permitted to configure the database system settings In other embodiments, the database cloud service may be offered as, or in conjunction with, a Software-as-a-Service (SaaS), Middleware-as-a-Service (MWaaS), Infrastructure-as-a-Service (IaaS), or some other cloud computing solution.

The architecture of the cloud platform, including the hardware and software resources used to provide the database cloud services, may vary from implementation to implementation and may be updated by the service provider over time. In one embodiment, the cloud platform may provide the consumer with access to a distributed database system, where the consumer's database is distributed across a plurality of physical locations. In another embodiment, the cloud platform may provide the consumer with access to a non-distributed database that resides on a single node.

FIG. 1 is a block diagram depicting an example system that may be used to provide database cloud services to consumers, according to an embodiment. System 100 includes one or more network hosts 110a to 110n, which are connected to network 120. Network hosts 110a to 110n may be any computing device capable of sending and receiving data over network 120. Examples include, without limitation, devices that implement the Internet Protocol Suite (IP hosts), such as desktop computers, laptops, tablets, and mobile phones. Network hosts 110a to 110n include clients 112a to 112n, which act as interfaces between the consumers and their respective database cloud services. Each of clients 112a to 112n may comprise a set of one or more software applications which may be used by a consumer to register for a database cloud service and/or access the service. For example, clients 112a to 112n may include, without limitation a web browser, an integrated development environment (IDE) such as SQL Developer, and other applications that provide an interface for interacting with a web server. Clients 112a to 112n may comprise a graphical user interface (GUI) for receiving input and displaying output to consumers.

Network 120 may comprise one or more private and public computer networks (e.g., the Internet) that communicate according to a set of communication protocols (e.g., protocols included in the Internet Protocol Suite). In an embodiment, clients 112a to 112n communicate with cloud system 130 through a web application programming interface (API), such as through web services that follow the architectural principals of representational state transfer (RESTful web services). RESTful web services may include the following characteristics: the web services explicitly use methods of the Hypertext Transfer Protocol (HTTP), the web services are accessible through URIs, and the services are stateless. Accordingly, clients 112a to 112n may access their respective services by sending HTTP and HTTP Secure (HTTPS) requests to cloud system 130. The term "HTTP request" as used herein may refer, without limitation, to both HTTP and HTTPS requests.

Cloud system 130 includes cloud server 140 and one or more database systems 150a to 150n. Cloud server 140 may act as a central hub to receive and service requests from various consumers. Cloud server 140 may comprise web server 142, application server 144, and connection pool 146. Web server 142 performs access control, such as verifying a consumer's authentication credentials and establishing secure connections for the consumer. Web server may store consumer requests in an administrative database for subsequent processing by application server 144. The administrative database (not shown) may be provisioned into one of database systems 150a to 150n. The administrative database may also store mapping data for routing connections to database systems 150a to 150n. Application server 144 may include an event handler that polls the administrative database for consumer requests that have not yet been processed. Application server 144 may route and process the requests according to techniques described further herein. Although only one cloud server 140 is depicted, in other implementations, cloud system 130 may include multiple cloud servers. For example, one cloud server may service a plurality of databases physically located in one region while a second cloud server may be used to service a plurality of databases physically located in a different region. In addition, each cloud server may include multiple web servers and/or application servers. Each Cloud and/or application server is capable of routing to multiple databases, establishing a one-to-many relationship between the server that receives consumer requests and the database systems that store consumer data.

Databases systems 150a to 150n manage and store organized collections of data for a plurality of consumers. Databases 150a to 150n collectively or a subset of one or more of databases 150a to 150n may be referred to herein as a "cloud database". Each of databases systems 150a to 150n may comprise a database server that provides application server 144 (which may comprise a database client) with access to an underlying database. Each of database systems 150a to 150n may correspond to a different database instance comprising a set of memory structures and/or processes used by a database management system (DBMS) to manage and access files stored in an underlying database. For example, a database instance may include, without limitation, data caches for storing memory retrieved from the database, log writing processes for writing data to a log in the database, and/or input/output (I/O) processes for interacting with database files on disk. Cloud server 140 may be communicatively coupled to database systems 150a to 150n via one or more data communication networks, such as a Local Area Network (LAN), or via a direct physical connection.

Web-Addressable Database Schemas

In an embodiment, each database cloud service has a unique, URI-addressable database schema. The database schema that is allocated for a particular database cloud service may logically represent a storage location within a database where a consumer may store data. The database schema defines and/or describes a set of one or more database objects within a database and namespace for those database objects. A namespace is a domain of objects in which the name of an object is unique among the names of other objects of that type and/or other types within the namespace. For example, within a schema, the label or name of a table is unique among the name of tables and views within a schema. However, two tables in two different schemas may have the same name.

Consumers of a particular database cloud service are associated with a schema. By default, the names of database objects referenced in queries issued by a user associated with a schema are resolved to database objects within the schema. For example, a schema A and schema B both include a table with the label EMPLOYEE. Both tables are in the same database. A consumer associated with schema A issues a query referencing a table by the name EMPLOYEE. During compilation of the query, the name EMPLOYEE is resolved to the so named table within schema A. A database schema may comprise, without limitation, one or more dedicated tablespaces, where the consumer may store tables, indexes, sequences, views, and other database objects. A tablespace, as used herein, refers to a defined and named set of files or portion of a file that holds database data. As further described herein, consumers of database cloud service each database schema may be isolated from database schemas of other database services in cloud system 130 as described in further detail in CLOUD DATABASE LOCKDOWN. Thus, a consumer may access the database schema allocated for their database cloud service, but may not access objects that belong to other database schemas.

The URI assigned to a particular database cloud service is an address comprising a string of characters that uniquely identifies an individual database schema. The URI scheme used may vary from implementation to implementation. For example, the URI may include a uniform resource locator (URL) and/or a uniform resource name (URN). In an embodiment, the URI is a web address that follows the HTTP or HTTPS URL scheme.

Cloud server 140 maintains mapping data that map at least a portion of the URI to a respective database cloud service. FIG. 2 is a chart depicting example mapping data, according to an embodiment. Mapping data includes a URI expression that maps to an identifier (e.g., a name) for the database (or database system) and the database schema. In the example depicted, URL expressions 1 to 3 map to different services or schemas within the same database system (i.e., the database with identifier DB1). Similarly, URL expressions 4 and 5 map to different schemas within DB2, and URL expression 6 maps to a schema in DB3. The URL expressions may comprise the entire URL assigned to a particular database cloud service or only a portion of the URL (e.g., a subset of the string of characters of the assigned URL).

Figure 3:
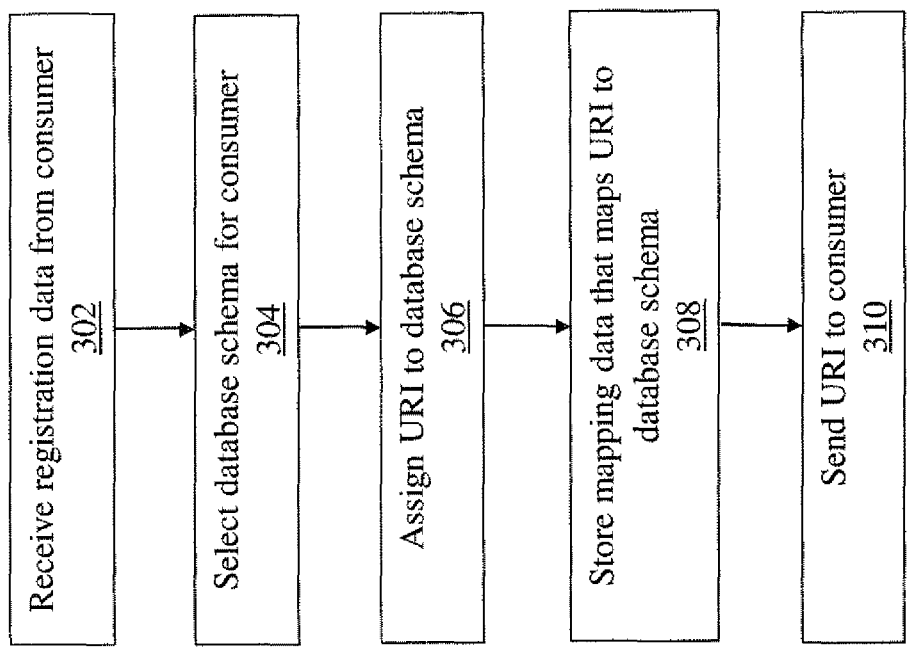
FIG. 3 is a flowchart depicting an example registration process that maps a Uniform Resource Locator to a database cloud service, according to an embodiment.

The URI may be generated when a consumer first registers for a database cloud service. FIG. 3 is a flowchart depicting an example registration process that maps a URI to a database cloud service, according to an embodiment. In step 302, cloud server 140 receives registration information from a consumer. Example registration information may include, without limitation a username, password, email address, and level of service. The level of service may specify the amount of space that a consumer would like to have allocated for their database cloud service. The user may submit the registration information through one of clients 112a to 112n to create an account with the service provider.

In step 304, application server 144 selects a database schema for the consumer based on the registration information. To select the database schema, each of database systems 150a to 150n may be pre-provisioned with multiple database schemas. Each database schema may be associated with a particular level of service offering to an end consumer. For example, if the service offers five, twenty, and fifty gigabyte offerings, database schemas corresponding to these different sizes may be pre-provisioned. Based on the level of service requested by the consumer, application server 144 may select an available database schema to assign to the consumer. Accordingly, if the user requests five gigabytes of storage, application server 144 may select a storage location that comprises five or more gigabytes. In an alternative embodiment, the database schemas may be provisioned in an on-demand manner. For example, during the registration process, application server 144 may create a new database schema that satisfies the demands of the consumer.

In step 306, application server 144 assigns a URI to the database schema. Application server 144 may automatically generate the URI by selecting a randomized or sequential domain name. For example, the first consumer to register for a database service may be assigned a URL such as https://dbabcxyz1.db.cloud.oracle.com. The next consumer may then be assigned the sequentially generated URL https://dbabcxyz2.db.cloud.oracle.com, and the process may continue with sequential domain names as more consumers register for a database cloud service. In an alternative embodiment, the URI may be generated based on a user-provided domain name. For example, the user may select a domain name such as acme-hr for the database cloud service. A URL, such as https://acem-hr.db.cloud.oracle.com, may then be generated and assigned to the corresponding database schema. In addition to uniquely identifying a database schema, the URI may also be used to identify a database system on which the database schema resides and/or a server that routes consumer requests to the database system. Although the URI uniquely identifies a database schema, multiple URIs may map to the same application server and database system.

In step 308, application server 144 stores mapping data that maps at least a portion of the URL to the database schema of a database cloud service. Mapping data such as those depicted in FIG. 2 may be stored in the administrative database. As consumers register or deregister from their database cloud services, the mapping rules are updated by adding or deleting entries, respectively. In some embodiments, application server 144 may cache all or a portion of the mapping data.

In step 310, application server 144 sends the URI to the consumer. In an embodiment, application server 144 sends the URI to a consumer-provided email address. In addition or alternatively, application server 144 may return the URI to one of clients 112a to 112n, which may display the URI to an end user and/or store the URI for subsequent use.

Cloud Database Connection Routing

Once a consumer has registered for a database cloud service, the consumer may add, modify, delete, fetch, and/or otherwise access data stored within the consumer's database schema by issuing requests over the Internet through one or more of clients 112a to 112n. For example, using a GUI displayed by one of clients 112a to 112n, a user may identify data that the user would like access in the cloud database. In another example, the user may identify, through a user interface on one of clients 112a to 112n, a SQL script comprising a set of one or more SQL commands that the user would like to deploy to the cloud database. The web requests issued by clients 112a to 112n include the URI for the consumer's database cloud service. A client may obtain the URI from a consumer through a user interface or may have previously stored/saved the URI.

Figure 4:
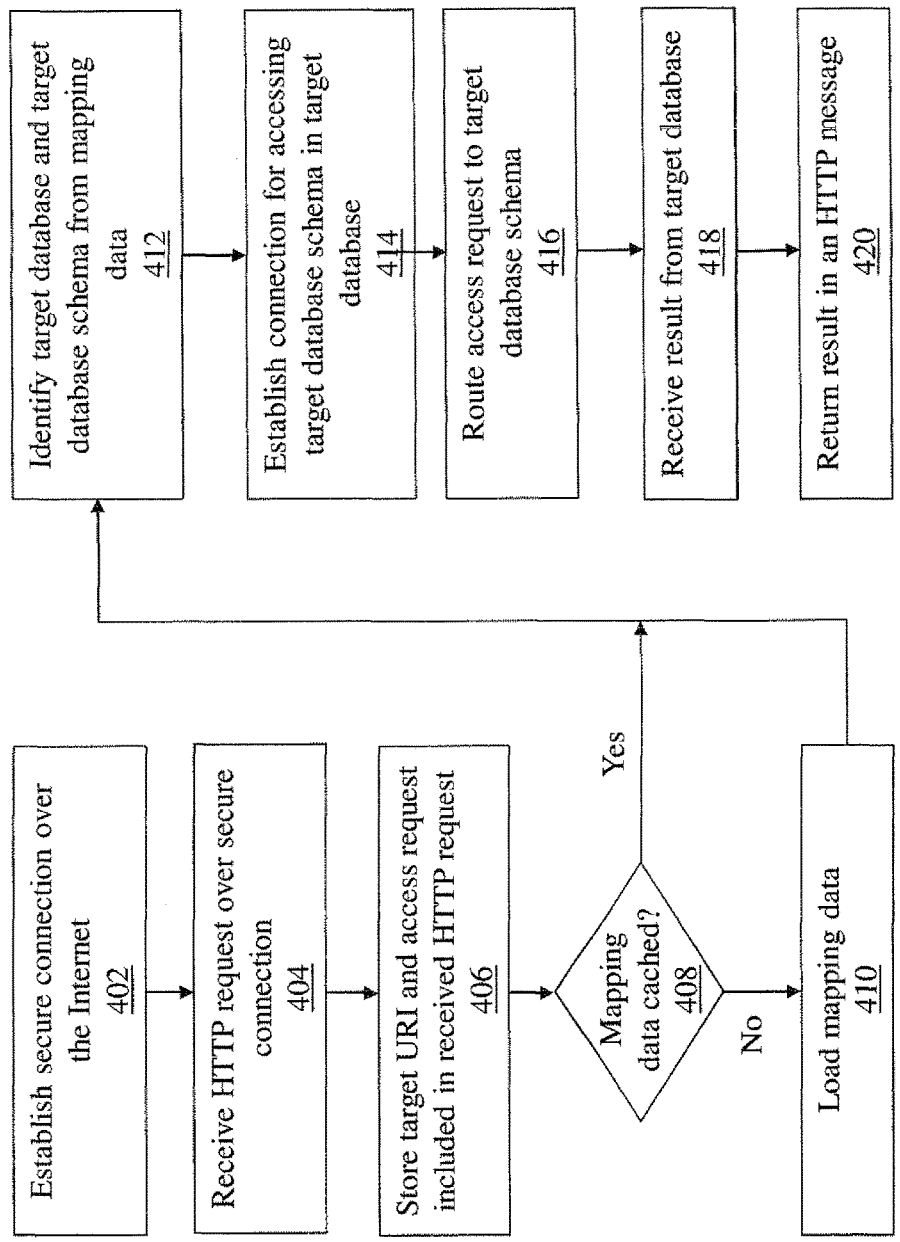
FIG. 4 is a flowchart depicting an example process for routing requests to corresponding database cloud services, according to an embodiment.

In response to receiving a request from a client, cloud server 140 determines which database and database schema to route the request to based on the URI included in the request. FIG. 4 is a flowchart depicting an example process for routing requests to corresponding database cloud services, according to an embodiment. In step 402, a secure connection (e.g., an HTTPS connection) is established over the Internet between one or more of clients 112a to 112n and cloud server 140. To establish a secure connection, the consumer may enter authentication information, such as a username and password, into a GUI provided by one of clients 112a to 112n. The authentication information is sent to web server 142, which verifies the information. If the information is correct, web server 142 proceeds with establishing a secure connection via an encryption protocol such as Secure Socket Layer (SSL) or Transport Layer Security (TLS). If the authentication information cannot be verified, then web server 142 may return an error message to the respective client to indicate that the user could not be authenticated and that a secure connection could not be established.

In step 404, web server 142 receives one or more encrypted HTTP requests over the secure connection (e.g., an HTTPS connection). The HTTP requests include a URI (herein referred to as a "target URI") for a particular database schema/database cloud service and a request (herein referred to as an "access request") to access data stored in the particular database schema. The access request may include or identify a set of one or more database commands to add, delete read, modify, or otherwise access data in the consumer's database schema. The format of the access request may vary from implementation to implementation. For example, the access request may include an SQL script that includes one or more Data Definition Language (DDL) and Data Manipulation Language (DML) commands. In another embodiment, the database commands may be specified in a JavaScript Object Notation (JSON) or Extensible Markup Language (XML) format. In yet another embodiment, the access request may identify the location of a staging site that stores a deployment file for loading data into the target database schema, as described in LOADING A DATABASE INTO THE CLOUD.

In step 406, web server 142 decrypts the HTTP requests and stores the target URI and access request in a work queue in the administrative database. Application server 144 periodically polls the administrative database to identify new access requests. In response to identifying a work request in the work queue, application server 144 processes and routes the requests as described in further detail below.

In step 408, while processing a particular request, application server 144 determines whether mapping data for the corresponding target URI currently resides in the server's cache. In an embodiment, application server 144 queries the cache to determine whether an expression pattern stored in the cache matches the target URI or a portion of the target URI. If the mapping data has not been loaded (i.e., there is a cache miss), then, in step 410, application server 144 loads the mapping data from the administrative database into the cache.

In step 412, application server 144 identifies, from the cached mapping data, a target database system and a target database schema. For example, referring to FIG. 2, if the target URI includes the URL expression 1, then the target database system is DB1 and the target schema is SCHEMA1. Similarly, URL expression 2 maps to target database system DB1 and target schema SCHEMA2, etc.

In step 414, application server 144 establishes a connection for accessing the target database schema. This step may comprise generating and/or opening a new connection to the target database system where the target database schema is located and establishing a database session for the target database schema. For example, application server 144 may generate a database connection string, such as a JDBC connection string, that identifies a target database server, a target database, and a target database schema. In other embodiments, application server 144 may use an existing connection to connect to the target database system. Techniques for using existing connections to route requests via connection proxying and connection pooling are described in further detail below. During this step, schema identification data (e.g., a schema name, label, or other identifier) may be sent to the target database system. The target database system uses the schema identification data to determine which database schema to access when evaluating database commands received over the connection. The target database system may restrict access to the target database schema to prevent cross-schema accesses. Techniques for isolating database schemas are described in CLOUD DATABASE LOCKDOWN.

In step 416, application server 144 routes the access request to the target database system for further processing. During this step, application server 144 may translate the access request into the set of database commands recognized by the target database system. For example, application server 144 may initially receive the access request in a first format. Example formats include, without limitation, a JSON and XML format. Application server 144 may then translate the access request into a second format, such as a SQL format, and send the database commands through the connection to the target database system. In an alternative embodiment, access request may identify the location of a SQL script or other file based on the access request, such as described in LOADING A DATABASE INTO THE CLOUD. Application server 144 may download the file from the staging site and issue the database queries included in the file. In yet another embodiment, application server 144 may issue the access request as received form the client, without performing any translation or downloading. The target database system executes a set of one or more database commands included in or otherwise identified by the access request to access database objects in the target database schema. The target database system may identify the target database schema based on a schema identification data sent by application server 144 at step 414.

In step 418, application server 144 receives a result based on data within the target database schema of the target database. The result that is returned may vary from implementation to implementation. For example, the target database system may return a particular row, column, table, or other data stored in the target database schema.

In step 420, application server 144 returns the result in an HTTP message to the client that issued the access request. During this step, application server 144 may translate the result (e.g., a SQL query) to a different format for inclusion in an HTTP message. Example formats include, without limitation, a JSON format and an XML format. These formats may be used to serialize the data for transmission over a network connection to various web applications.

Upon receipt of the HTTP message, the receiving client may process the returned result to generate display data and display the result to a user. For example, the client may display a tabular view of the returned data through a GUI.

Connection Pooling and Connection Multiplexing

In order to reduce the overhead associated with creating and closing database connections, application server 144 may route consumer requests using available connections in connection pool 146. Connection pool 146 may comprise a plurality of pooled connections, where each pooled connection instance represents a single physical or network connection to one of database systems 150$a$ to 150$n$ and is associated with a set of one or more logical connections. A logical connection acts as a temporary handle to the physical connection represented by the associated pooled connection instance and may be returned by the pooled connection instance as an available connection if not in use by another consumer. When in use, each logical connection may correspond to a different database session, where a user process on application server 144 communicates over the physical connection with a server process on one of database systems 150$a$ to 150$n$.

When establishing a connection at step 414, application server 144 may check the pooled connection instance associated with the target database to determine whether a logical connection is available. If a logical connection is not available, application server 144 may create a new logical connection or wait for an existing logical connection to become available. If a logical connection is available, then the pooled connection instance returns the corresponding handle to application server 144, and application server 144 uses the returned logical connection to send the database commands to the target database system.

The same logical connection may be used by different consumers at different times. For example, a first consumer may issue a request to application server 144 to access first target schema in a target database. Application server 144 selects a logical connection from connection pool 146, alters the state of the logical connection to access the first target schema (e.g., by issuing an ALTER SESSION statement through the connection driver to change the current schema associated with a session), and sends the set of database commands over the logical connection. After the results have been returned, application server 144 resets the state of the connection to prevent any lingering state associated with the first consumer's session. Once the logical connection has been reset, the logical connection is ready to be used by a different consumer (or the same consumer), and application server 144 may process a second consumer's request by following the same process. Accordingly, application server 144 selects an available logical connection from connection pool 146, which may be the same logical connection selected for the first consumer. Application server 144 then alters the state of the logical connection to connect to a second target schema in the target database and issues the second consumer's request over the logical connection.

Application server 144 and database systems 150$a$ to 150$n$ may support connection multiplexing. A multiplexed connection uses a single network or physical connection between application server 144 and one of database systems 150$a$ to 150$n$ to handle multiple logical database connections. By multiplexing connections, cloud system 130 may concurrently handle requests from a plurality of consumers, even when those requests are directed to the same target database. Thus, the consumers may concurrently share the same application server, physical connection, target database, and database instance. Example database instance resources that may be shared by different database cloud services include, without limitation, may include, without limitation, input/output (I/O) processes for reading and writing data to the target database, log writing processes for writing log data to a log file, checkpoint processes for maintaining logical time for the target database, monitoring processes for monitoring system performance of the target database system, database buffer caches for buffering data read from the target database, redo log buffers for buffering redo records, and data dictionary caches for storing database metadata.

In order to multiplex connections, application server 144 may use different logical connections over the same physical connection. When application server 144 receives consumer requests with URIs that map to different database schemas in the same database, application server 144 may select or create multiple logical connections to concurrently process the requests. For example, application server 144 may receive a first request from a consumer that includes a first URI. Application server 144 selects, from connection pool 146, a first logical connection, to connect a user process handling the first consumer's request to a database instance in the database system. Application server 144 may then send the access request over the first logical connection to the target database system, where a server process processes the request and returns a result to the user process over the first logical connection. While application server 144 is processing the first consumer's request, application server 144 may receive a second consumer request that includes a second URI that maps to a different database schema of the same target database. In response application server 144 may select a second logical connection from connection pool 146 and send the second consumer's request over the second logical connection. The second consumer's request may be sent to the same database instance as the first consumer's request. A second server process may process the second request and return a result over the second logical connection. This process may continue for as many consumer requests as there are logical connections supported for a physical connection. Once the consumer's request has been fully processed, the logical connection may be reset and released back into connection pool 146 for reuse by another user process.

Demand Based Connection Generation

The number of pooled and logical connections may vary from implementation to implementation. In some embodiments, application server 144 may generate pooled and/or logical connections based on consumer demand. For example, in an initial state, there may be no pooled connections for a target database system. Once a consumer request is first received with a URI that addresses a target database schema within the target database system, application server 144 may generate a pooled connection and a set of one or more logical connections for accessing a target database within the target database system.

The number of logical connections may increase as the demand increases. The demand may be determined based on the frequency with which requests are received that include URIs directed to a particular database system. As the frequency becomes greater, application server 144 may generate and add more logical connections to the pooled connection for that target database system. This allows a greater number of requests to be concurrently processed. Even after the consumer's request has been completely processed, the newly created logical connections may be kept open and used to process requests from other consumers. If the logical connection has not been used for a threshold amount of time, then application server 144 may close the connection. Accordingly, the number of logical connection may decrease as demand to access a target database decreases. In some embodiments, the number of logical connections for a pooled connection may be prevented from decreasing below a threshold. For example, each pooled connection may maintain at least one logical connection. Alternatively, a pooled connection may be closed if demand falls below a threshold.

In some embodiments, application server 144 may maintain a fixed number of pooled connection instances and/or logical connection instances. For example, application server 144 may maintain one pooled connection per database system. Each pooled connection may be associated with the same number of logical connection instances, or a different number of logical connection instances. The number may be determined and set by a service provider of the database cloud service.

URI Based Proxying

In some embodiments, application server 144 may create proxy connections to database systems 150a to 150n based on the URI received. A proxy connection allows a consumer to connect to a target database system through another user. For example, application server 144 may keep a set of one or more logical connections open as a generic user that is not associated with any consumer. When an HTTP request is received, application server 144 may create a proxy connection to access a consumer's database schema.

The manner in which a proxy connection is generated may vary from implementation to implementation. In some embodiments, application server 144 may send an ALTER USER and/or an ALTER SESSION statement to the target database system to switch to a different schema. For example, the logical connection may initially be associated with a generic user. When a consumer request is received, application server 144 maps the URI to a name assigned to the target database schema. Application server 144 may then issue an ALTER USER command to a server running on the target database to change the authentication and/or database resource characteristics associated with a connection from the generic user to the consumer. The target database system may then process queries received over the logical connection in accordance with the new authentication and database resource characteristics (e.g., by limiting access to the target database schema). Once the application server 144 has finished processing the consumer's request, application server 144 may reset the connection to close the proxy connection and eliminate any state information associated with the consumer's request. Thus, the logical connection is kept open by the generic user, but is no longer associated with the consumer.

Figure 5:
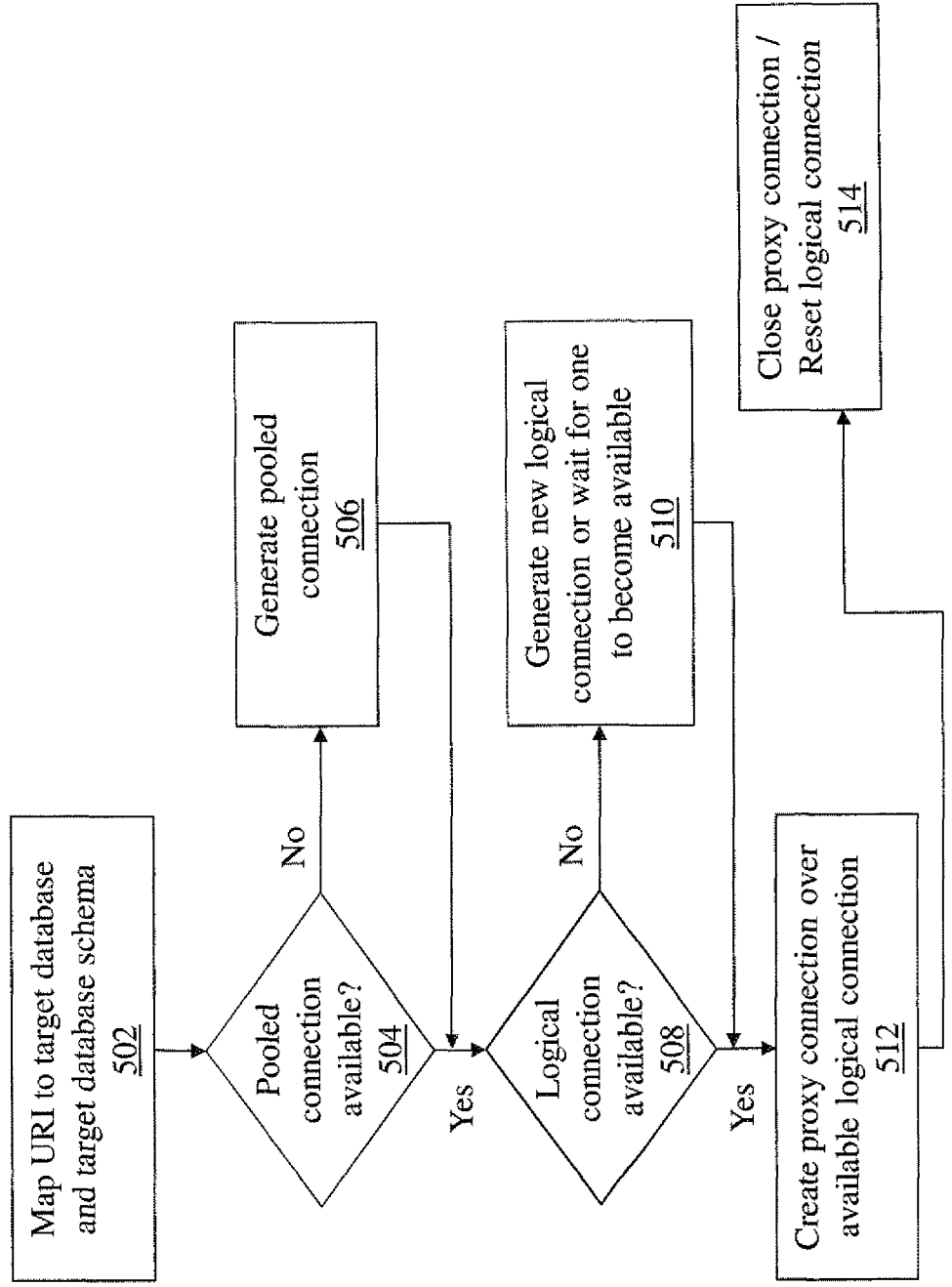
FIG. 5 is a flowchart depicting an example process for establishing a connection by using proxy authentication and connection pooling, according to an embodiment.

FIG. 5 is a flowchart depicting an example process for establishing a connection by using proxy authentication and connection pooling, according to an embodiment. In step 502, application server 144 maps a URI to a target database (or database system) and a target database schema. In step 504, application server 144 determines whether there is a pooled connection for the target database system. If a pooled connection does not exist, then, in step 506, application server 144 generates a pooled connection for the target database system and a set of one or more logical connections. If a pooled connection already exits, then, in step 508, application server 144 determines whether a logical connection is available in the pooled connection. If a logical connection is not available, then, in step 510, application server 144 generates a new logical connection or waits for a logical connection to become available. In step 512, application server 144 creates a proxy connection over the available logical connection. In step 514, application server 144 closes the proxy connection once the consumer request has been processed.

Stateless Request Processing

In an embodiment, HTTP requests received from consumers are processed as independent transactions that are unrelated to any previous web requests. Thus, application server 144 does not store any state information once a consumer's request has been completely processed. The application may completely process each request based on the information contained in the HTTP request without receiving any additional HTTP requests from the client. With stateless requests, application server 144 may use a different database session for each request received from a consumer. For example, when a first request is received, application server 144 may establish a first database session for accessing the target database schema using a first logical connection. Application server 144 may then receive a second request that includes the same URI as the first request. In response, application server 144 may establish a second database session for accessing the target database schema using a second logical connection, different from the first logical connection.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
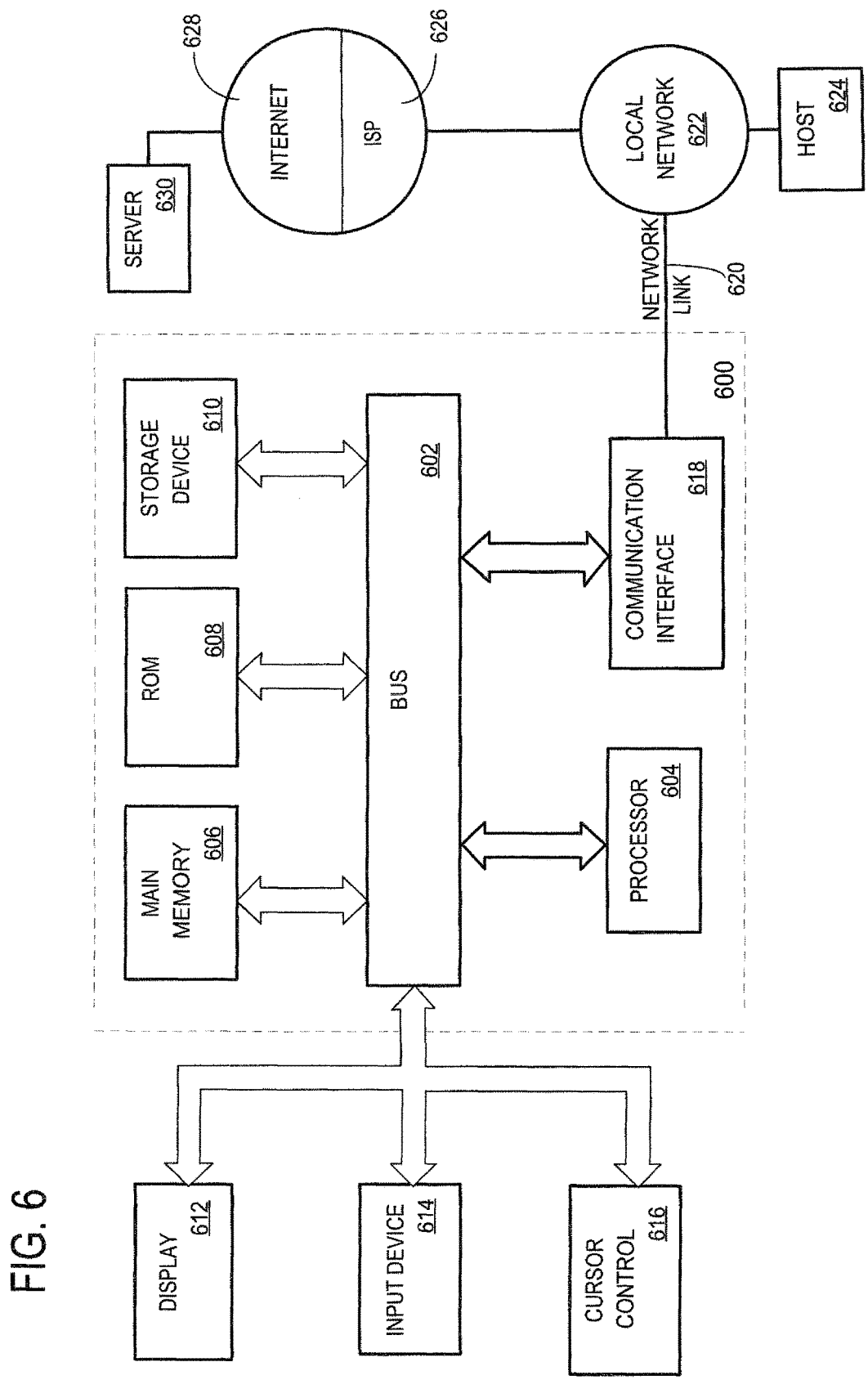
FIG. 6 is a block diagram depicting a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for routing requests for database cloud services, the method comprising:
   receiving, from a consumer over a computer network, registration data;
   in response to receiving said registration data:
   a) assigning a particular Uniform Resource Identifier (URI) to a particular database schema by:
   generating the particular database schema based on the registration data, or
   selecting, based on a particular level of database service indicated in the registration data of a plurality of levels of database service, the particular database schema from a plurality of database schemas in one or more databases, and b) returning, to the consumer, the particular URI over the computer network;

for each respective database schema of the plurality of database schemas, storing mapping data that maps at least a portion of a respective URI to the respective database schema, wherein said mapping data maps at least a portion of said particular URI to said particular database schema;

receiving a first request that includes the particular URI and identifies a first set of one or more database commands;

in response to receiving the first request, identifying, based on the mapping data and the particular URI included in the first request, the particular database schema in a target database of the one or more databases;

establishing a first connection for accessing the particular database schema in the target database;

sending the first set of one or more database commands over the first connection to access the particular database schema in the target database.

2. The method of claim 1, further comprising:

receiving a second request that includes a second URI and identifies a second set of one or more database commands;

in response to receiving the second request, identifying, based on the mapping data and the second URI included in the second request, a second database schema in the target database;

establishing a second connection for accessing the second database schema in the target database;

wherein the first connection and the second connection are multiplexed over a same physical connection to the target database.

3. The method of claim 1, wherein said receiving the registration data comprises receiving a request to register for a database cloud service;

wherein each respective database schema of the plurality of database schemas corresponds to a different database cloud service.

4. The method of claim 1, wherein establishing the first connection for accessing the particular database schema in the target database comprises:

selecting an available connection for accessing the target database from a connection pool;

wherein the available connection is released back to the connection pool after the first request has been processed.

5. The method of claim 4, wherein establishing the first connection for accessing the particular database schema in the target database comprises:

establishing, for a first database cloud service, a proxy connection over the available connection.

6. The method of claim 1, wherein establishing the first connection for accessing the particular database schema in the target database comprises:

determining whether a connection for accessing the target database is available from a connection pool;

in response to determining that a connection for accessing the target database is not available from the connection pool, generating a new connection for accessing the target database and adding the new connection to the connection pool.

7. The method of claim 1, wherein the first request is a Hypertext Transfer Protocol (HTTP), the method further comprising:

receiving a result from the particular database schema of the target database;

sending the result in a Hypertext Transfer Protocol (HTTP) message to a client;

removing state information associated with the first request by resetting the first connection for accessing the particular database schema in the target database.

8. The method of claim 1, wherein the plurality of database schemas further include database schemas that have not been assigned a URI.

9. One or more non-transitory computer-readable media storing instructions, which, when executed by one or more processors, cause:

receiving, from a consumer over a computer network, registration data;

in response to receiving said registration data:

a) assigning a particular Uniform Resource Identifier (URI) to a particular database schema by:

generating the particular database schema based on the registration data, selecting, based on a particular level of database service indicated in the registration data of a plurality of levels of database service, the particular database schema from a plurality of database schemas in one or more databases, and b) returning, to the consumer, the particular URI over the computer network;

for each respective database schema of the plurality of database schemas, storing mapping data that maps at least a portion of a respective URI to the respective database schema, wherein said mapping data maps at least a portion of said particular URI to said particular database schema;

receiving a first request that includes the particular URI and identifies a first set of one or more database commands;

in response to receiving the first request, identifying, based on the mapping data and the particular URI included in the first request, the particular database schema in a target database of the one or more databases;

establishing a first connection for accessing the particular database schema in the target database;

sending the first set of one or more database commands over the first connection to access the particular database schema in the target database.

10. The one or more non-transitory computer-readable media of claim 9, further comprising instructions, which, when executed by one or more processors, cause:

receiving a second request that includes a second URI and identifies a second set of one or more database commands;

in response to receiving the second request, identifying, based on the mapping data and the second URI included in the second request, a second database schema in the target database;

establishing a second connection for accessing the second database schema in the target database;

wherein the first connection and the second connection are multiplexed over a same physical connection to the target database.

11. The one or more non-transitory computer-readable media of claim 9, wherein said receiving the registration data comprises receiving a request to register for a database cloud service;

wherein each respective database schema of the plurality of database schemas corresponds to a different database cloud service.

12. The one or more non-transitory computer-readable media of claim 9, wherein establishing the first connection for accessing the particular database schema in the target database comprises:
selecting an available connection for accessing the target database from a connection pool;
wherein the available connection is released back to the connection pool after the first request has been processed.

13. The one or more non-transitory computer-readable media of claim 12, wherein establishing the first connection for accessing the particular database schema in the target database comprises:
establishing, for a first database cloud service, a proxy connection over the available connection.

14. The one or more non-transitory computer-readable media of claim 9, wherein establishing the first connection for accessing the particular database schema in the target database comprises:
determining whether a connection for accessing the target database is available from a connection pool;
in response to determining that a connection for accessing the target database is not available from the connection pool, generating a new connection for accessing the target database and adding the new connection to the connection pool.

15. The one or more non-transitory computer-readable media of claim 9, wherein the first request is a Hypertext Transfer Protocol (HTTP), further comprising instructions, which, when executed by one or more processors, cause:
receiving a result from the particular database schema of the target database;
sending the result in a Hypertext Transfer Protocol (HTTP) message to a client;
removing state information associated with the first request by resetting the first connection for accessing the particular database schema in the target database.

16. The one or more non-transitory computer-readable media of claim 9, wherein the plurality of database schemas further include database schemas that have not been assigned a URI.

17. A system for routing requests for database cloud services, the system comprising:
one or more processors;
one or more non-transitory computer-readable media storing instructions, which, when executed by the one or more processors, cause:
receiving, from a consumer over a computer network, registration data;
in response to receiving said registration data:
a) assigning a particular Uniform Resource Identifier (URI) to a particular database schema by:
generating the particular database schema based on the registration data, or
selecting, based on a particular level of database service indicated in the registration data of a plurality of levels of database service, the particular database schema from a plurality of database schemas in one or more databases, and
b) returning, to the consumer, the particular URI over the computer network;
for each respective database schema of the plurality of database schemas, storing mapping data that maps at least a portion of a respective URI to the respective database schema, wherein said mapping data maps at least a portion of said particular URI to said particular database schema;
receiving a first request that includes the particular URI and identifies a first set of one or more database commands;
in response to receiving the first request, identifying, based on the mapping data and the particular URI included in the first request, the particular database schema in a target database of the one or more databases;
establishing a first connection for accessing the particular database schema in the target database;
sending the first set of one or more database commands over the first connection to access the particular database schema in the target database.

18. The system of claim 17, wherein the instructions further cause:
receiving a second request that includes a second URI and identifies a second set of one or more database commands;
in response to receiving the second request, identifying, based on the mapping data and the second URI included in the second request, a second database schema in the target database;
establishing a second connection for accessing the second database schema in the target database;
wherein the first connection and the second connection are multiplexed over a same physical connection to the target database.

19. The system of claim 17,
wherein said receiving the registration data comprises receiving a request to register for a database cloud service;
wherein each respective database schema of the plurality of database schemas corresponds to a different database cloud service.

20. The system of claim 17, wherein establishing the first connection for accessing the particular database schema in the target database comprises:
selecting an available connection for accessing the target database from a connection pool;
wherein the available connection is released back to the connection pool after the first request has been processed.

21. The system of claim 20, wherein establishing the first connection for accessing the particular database schema in the target database comprises:
establishing, for a first database cloud service, a proxy connection over the available connection.

22. The system of claim 17, wherein establishing the first connection for accessing the particular database schema in the target database comprises:
determining whether a connection for accessing the target database is available from a connection pool;
in response to determining that a connection for accessing the target database is not available from the connection pool, generating a new connection for accessing the target database and adding the new connection to the connection pool.

23. The system of claim 17, wherein the first request is a Hypertext Transfer Protocol (HTTP), further comprising instructions, which, when executed by one or more processors, cause one or more computing devices to perform:
receiving a result from the particular database schema of the target database;

sending the result in a Hypertext Transfer Protocol (HTTP) message to a client;

removing state information associated with the first request by resetting the first connection for accessing the particular database schema in the target database.

24. The system of claim 17, wherein the plurality of database schemas further include database schemas that have not been assigned a URI.

25. The method of claim 1 wherein said particular level of database service comprises a particular amount of storage.

26. The method of claim 1 wherein said generating said particular database schema comprises generating said particular database schema based on said particular level of database service.

\* \* \* \* \*

UNITED STATES PATENT AND TRADEMARK OFFICE
CERTIFICATE OF CORRECTION

PATENT NO. : 10,536,545 B2
APPLICATION NO. : 14/485621
DATED : January 14, 2020
INVENTOR(S) : Divilly et al.

Page 1 of 1

It is certified that error appears in the above-identified patent and that said Letters Patent is hereby corrected as shown below:

On the Title Page

Column 2, item (56) under Other Publications, Line 1, delete "069/12/2014" and insert -- 09/12/2014 --, therefor.

In the Specification

In Column 1, Line 7, after "Appln." insert -- No. --.

In Column 1, Line 64, delete "embodiment" and insert -- embodiment; --, therefor.

In Column 3, Line 26, delete "settings In" and insert -- settings. In --, therefor.

In the Claims

In Column 16, Line 21, in Claim 9, after "data," insert -- or --.

Signed and Sealed this
Sixth Day of April, 2021

Drew Hirshfeld
*Performing the Functions and Duties of the
Under Secretary of Commerce for Intellectual Property and
Director of the United States Patent and Trademark Office*